United States Patent
Furuta et al.

(10) Patent No.: US 11,463,958 B2
(45) Date of Patent: Oct. 4, 2022

(54) COMMUNICATION DEVICE

(71) Applicant: KABUSHIKI KAISHA TOKAI RIKA DENKI SEISAKUSHO, Aichi (JP)

(72) Inventors: Masateru Furuta, Aichi (JP); Shigenori Nitta, Aichi (JP); Yuki Kono, Aichi (JP); Yosuke Ohashi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 57 days.

(21) Appl. No.: 17/070,200

(22) Filed: Oct. 14, 2020

(65) Prior Publication Data

US 2021/0168721 A1 Jun. 3, 2021

(30) Foreign Application Priority Data

Nov. 28, 2019 (JP) .............................. JP2019-214912

(51) Int. Cl.
*H04W 4/00* (2018.01)
*H04W 52/02* (2009.01)
*H04W 56/00* (2009.01)
*H04W 4/02* (2018.01)

(52) U.S. Cl.
CPC ....... *H04W 52/0235* (2013.01); *H04W 4/023* (2013.01); *H04W 52/0216* (2013.01); *H04W 56/001* (2013.01); *H04W 56/0055* (2013.01)

(58) Field of Classification Search
CPC ............. H04W 52/0235; H04W 4/023; H04W 52/0216; H04W 56/001; H04W 56/0055
See application file for complete search history.

(56) References Cited

U.S. PATENT DOCUMENTS

| | | | |
|---|---|---|---|
| 2016/0332598 A1* | 11/2016 | Ghabra | B60R 25/245 |
| 2018/0007507 A1* | 1/2018 | Ghabra | H04B 1/3822 |
| 2018/0068509 A1* | 3/2018 | Obergfell | B60R 25/24 |
| 2018/0118163 A1* | 5/2018 | Murakami | B60R 25/01 |
| 2018/0162321 A1* | 6/2018 | Spiess | G07C 9/29 |
| 2018/0234797 A1* | 8/2018 | Ledvina | B60R 25/24 |

FOREIGN PATENT DOCUMENTS

| | | |
|---|---|---|
| CN | 108698514 | 10/2018 |
| DE | 102018116874 | 2/2019 |
| JP | 11-208419 A | 8/1999 |
| WO | 2015/060040 | 4/2015 |
| WO | 2019/163165 | 8/2019 |

* cited by examiner

*Primary Examiner* — Erika A Washington
(74) *Attorney, Agent, or Firm* — Greenblum & Bernstein, P.L.C.

(57) ABSTRACT

[Object] To provide a mechanism that makes it possible to reduce electric power to be consumed to wait for reception of signals.
[Solution] A communication device comprising a control section configured to perform control in such a manner as to wait for reception of a second signal transmitted from another communication device after a first signal is transmitted to the other communication device.

19 Claims, 7 Drawing Sheets

COMMUNICATION DEVICE

CROSS REFERENCE TO RELATED APPLICATION(S)

This application is based upon and claims benefit of priority from Japanese Patent Application No. 2019-214912, filed on Nov. 28, 2019, the entire contents of which are incorporated herein by reference.

BACKGROUND

The present invention relates to a communication device.

In recent years, various kinds of technologies of measuring a distance between devices have been developed. For example, JP H11-208419A discloses a technology of measuring a distance between devices on the basis of a time period from transmission of a signal for measuring the distance between the devices to reception of a response thereto.

However, according to the technology disclosed in JP H11-208419A, a receiver of the signal for measuring the distance between the devices has to consume electric power during the time period of waiting for reception of the signal. Such a situation also happens in cases of signals other than the signal for measuring the distance between the devices.

Accordingly, the present invention is made in view of the aforementioned issues, and an object of the present invention is to provide a mechanism that makes it possible to reduce electric power to be consumed to wait for reception of signals.

SUMMARY

To solve the above described problem, according to an aspect of the present invention, there is provided a communication device comprising a control section configured to perform control in such a manner as to wait for reception of a second signal transmitted from another communication device after a first signal is transmitted to the other communication device.

To solve the above described problem, according to another aspect of the present invention, there is provided a communication device comprising a control section configured to perform control in such a manner as to transmit a second signal to another communication device after a first signal is received from the other communication device.

To solve the above described problem, according to another aspect of the present invention, there is provided a communication device configured to transmit a fifth signal to another communication device, wherein the fifth signal is a signal for instructing the other communication device to wait for reception of a second signal transmitted from the communication device after the fifth signal, and the fifth signal and the second signal are transmitted and received in conformity with different wireless communication standards.

To solve the above described problem, according to another aspect of the present invention, there is provided a communication device comprising a control section configured to perform control in such a manner as to wait for reception of a second signal transmitted from another communication device after a fifth signal is received from the other communication device, wherein the fifth signal and the second signal are transmitted and received in conformity with different wireless communication standards.

As described above, according to the present invention, it is possible to provide the mechanism that makes it possible to reduce electric power to be consumed to wait for reception of signals.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

<1. Configuration Example>

Figure 1:
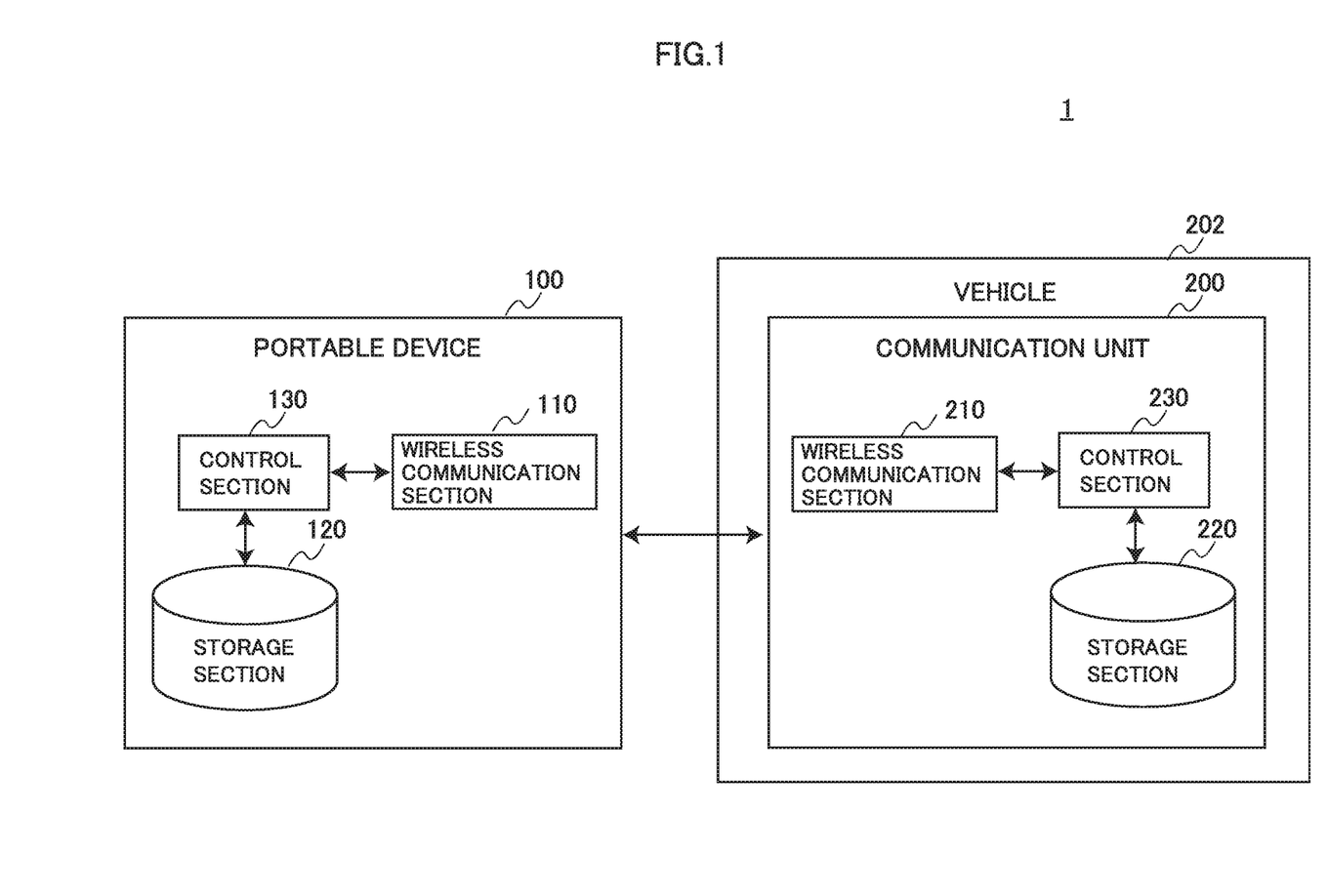
FIG. 1 is a diagram illustrating an example of a configuration of a system according to an embodiment of the present invention.

FIG. 1 is a diagram illustrating an example of a configuration of a system 1 according to an embodiment of the present invention. As illustrated in FIG. 1, the system 1 according to the present embodiment includes a portable device 100 and a communication unit 200. The communication unit 200 according to the present embodiment is installed in a vehicle 202. The vehicle 202 is an example of a target to be used by a user.

A communication device of an authenticatee (also referred to as a first communication device) and a communication device of an authenticator (also referred to as a second communication device) are involved in the present embodiment. In the example illustrated in FIG. 1, the portable device 100 is an example of the first communication device, and the communication unit 200 is an example of the second communication device.

When the user (for example, a driver of the vehicle 202) carrying the portable device 100 approaches the vehicle 202, wireless communication for authentication is established between the portable device 100 and the communication unit 200 installed in the vehicle 202. Next, when the authentication succeeds, the vehicle 202 becomes available for the user by unlocking a door lock of the vehicle 202 or starting an engine of the vehicle 202. The system 1 is also referred to as a smart entry system. Next, respective structural elements will be described sequentially.

(1) Portable Device 100

The portable device 100 is an example of the first communication device. The portable device 100 is configured as any device to be carried by the user. For example, any device may be an electronic key, a smartphone, a wearable terminal, or the like.

As illustrated in FIG. 1, the portable device 100 includes a wireless communication section 110, a storage section 120, and a control section 130.

The wireless communication section 110 has a function of establishing communication with communication unit 200 in conformity with a predetermined wireless communication standard. For example, the predetermined wireless communication standard uses an ultra-wideband (UWB) signal. An UWB impulse signal has a property that makes it possible to perform ranging with high accuracy. In other words, it is possible for the UWB impulse signal to measure air propagation time of a radio wave with high accuracy by using the radio wave of ultra-short pulse width in the order of nanoseconds or less, and it is possible to accurately perform ranging on the basis of the propagation time. Here, the ranging means to measure a distance between devices that transmit and receive the signal.

The wireless communication section 110 transmits and receives a signal for measuring a distance between devices in a ranging process. The ranging process is a process for measuring the distance between the devices.

An example of the signal used in the ranging process is a ranging signal. The ranging signal is a signal transmitted and received for measuring a distance between devices. The ranging signal is also a measurement target signal. For example, time taken to transmit or receive the ranging signal is measured. The ranging is configured in a frame format that does not include a payload part for storing data. In the ranging process, a plurality of the ranging signals may be transmitted and received between devices. Among the plurality of ranging signals, a ranging signal transmitted from one device to the other device is also referred to as a first ranging signal. In addition, a ranging signal transmitted from the device that has received the first ranging signal to the device that has transmitted the first ranging signal is also referred to as a second ranging signal.

Another example of the signal for the ranging process is a data signal. The data signal is a signal that stores and carries data. The data signal is configured in a frame format that includes the payload part for storing the data.

The ranging signal and the data signal may be transmitted and received as UWB signals. The wireless communication section 110 is configured as a communication interface that makes it possible to perform communication by using the UWB signals.

The storage section 120 has a function of storing various kinds of information for operating the portable device 100. For example, the storage section 120 stores a program for operating the portable device 100, and an identifier (D), password, and authentication algorithm for authentication, or the like. For example, the storage section 120 includes a storage medium such as flash memory and a processing device that performs recording/playback on/of the storage medium.

The control section 130 has a function of controlling overall operation performed by the portable device 100. For example, the control section 130 controls the wireless communication section 110 to establish communication with the communication unit 200. In addition, the control section 130 reads information from the storage section 120 and writes information into the storage section 120. The control section 130 also functions as an authentication control section that controls an authentication process between the portable device 100 and the communication unit 200. For example, the control section 130 may include an electronic circuit such as a central processing unit (CPU) and a microprocessor.

Note that, the control section 130 is an example of a first control section that controls operation of the first communication device.

(2) Communication Unit 200

The communication unit 200 is prepared in association with the vehicle 202. Here, the communication unit 200 is assumed to be installed in the vehicle 202. As an example of the installation position, the communication unit 200 may be installed in a vehicle cabin of the vehicle 202, or may be built in the vehicle 202 as a communication module, or the like. Alternatively, the communication unit 200 may be prepared as a separate object from the target to be used by the user in such a manner that the communication unit 200 is installed in a parking space for the vehicle 202 or in other manners. In this case, the communication unit 200 may wirelessly transmit a control signal to the vehicle 202 on the basis of a result of communication with the portable device 100 and may remotely control the vehicle 202. As illustrated in FIG. 1, the communication unit 200 includes a wireless communication section 210, a storage section 220, and a control section 230.

The wireless communication section 210 has a function of establishing communication with portable device 100 in conformity with a predetermined wireless communication standard. The wireless communication section 210 is configured as a communication interface that makes it possible to perform communication through UWB, for example.

The storage section 220 has a function of storing various kinds of information for operating the communication unit 200. For example, the storage section 220 stores a program for operating the communication unit 200, an authentication algorithm, and the like. For example, the storage section 220 includes a storage medium such as flash memory and a processing device that performs recording/playback on/of the storage medium.

The control section 230 has a function of controlling overall operation performed by the communication unit 200. As an example, the control section 230 controls the wireless communication section 210, communicates with the portable device 100, reads information from the storage section 220, and writes information into the storage section 220. The control section 230 also functions as an authentication control section that controls the authentication process between the communication unit 200 and the portable device 100. In addition, the control section 230 also functions as a door lock control section that controls the door lock of the vehicle 202, and locks and unlocks the door lock. The control section 230 also functions as an engine control section that controls the engine of the vehicle 202, and starts/stops the engine. Note that, a motor or the like may be installed as a power source in the vehicle 202 in addition to the engine. For example, the control section 230 may be configured as an electronic control unit (ECU).

Note that, the control section 230 is an example of a second control section that controls operation of the second communication device.

<2. Technical Problem>

Figure 2:
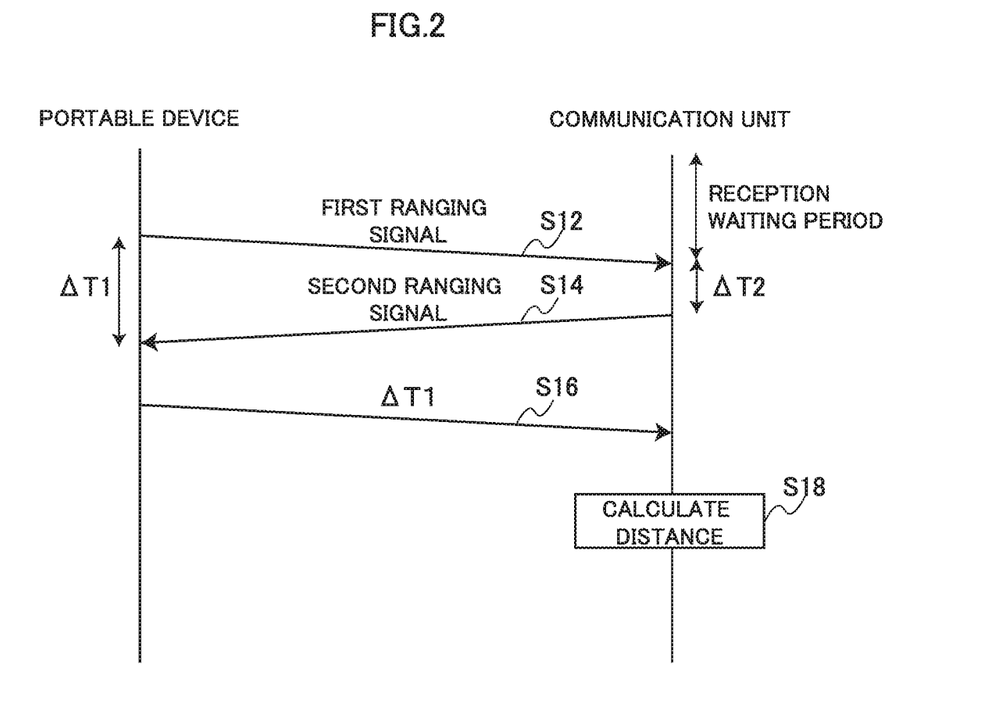
FIG. 2 is a sequence diagram illustrating an example of a flow of a conventional ranging process.

The smart entry system sometimes authenticates the portable device on the basis of a distance between the portable device and the communication unit installed in the vehicle. With reference to FIG. 2, an example of a flow of a ranging process conventionally performed for such authentication (hereinafter, also referred to as a conventional ranging process) will be described. The conventional ranging process described herein is a process of measuring a distance between a portable device and a vehicle.

FIG. 2 is a sequence diagram illustrating the example of the flow of the conventional ranging process. The portable device and a communication unit installed in the vehicle are involved in this sequence. As illustrated in FIG. 2, the portable device first transmits the first ranging signal (Step S12). When the first ranging signal is received from the portable device, the communication unit transmits the second ranging signal in response to the first ranging signal (Step S14). When the second ranging signal is received, the portable device measures a time period $\Delta T1$ that is a time period from time of transmission of the first ranging signal to time of reception of the second ranging signal. Next, the portable device transmits the data signal including information obtained by encrypting information indicating the measured time period $\Delta T1$ (Step S16).

On the other hand, the communication unit measures a time period $\Delta T2$ in advance. The time period $\Delta T2$ is a time period from time of reception of the first ranging signal to time of transmission of the second ranging signal. Next, when the data signal is received from the portable device, the communication unit calculates the distance between the portable device and the communication unit on the basis of the measured time period $\Delta T2$ and the time period $\Delta T1$ indicated by the data signal received from the portable device (Step S18). For example, time taken to transmit or receive a one-way signal is calculated by subtracting $\Delta T2$ from $\Delta T1$ and dividing the subtracted value by 2, and then the distance between the portable device and the communication unit is calculated by multiplying the calculated time by speed of the signal.

With reference to the sequence illustrated in FIG. 2, the conventional ranging process is started when the portable device transmits the first ranging signal. This makes it possible to prevent the portable device from waiting for reception of the second ranging signal transmitted from the communication unit before transmitting the first ranging signal, and it is possible to reduce electric power to be consumed by the portable device to do so. In addition, with reference to the sequence illustrated in FIG. 2, the vehicle, which is the authenticator, calculates the distance. This makes it possible to efficiently perform authentication based on the distance.

Note that, the "waiting for reception" means a state capable of acquiring and processing a desired signal. The state capable of acquiring and processing a desired signal may mean to start importing a signal received via an antenna into a processing device. In addition, the state capable of acquiring and processing a desired signal may mean to start performing various kinds of subsequent processes on the signal imported into the processing device. Note that, in the case where the system is configured in such a manner that the processing device imports the signal when reception of the desired signal via the antenna is detected, the state capable of acquiring and processing a signal may mean to receive the desired signal via the antenna.

Examples of the various kinds of subsequent processes include a process of determining whether or not a signal received via the antenna is the desired signal, a process of checking information included in the signal, and other processes.

The state of waiting for reception is also referred to as a reception waiting state. In addition, a period in which the device is in the reception waiting state is also referred to as the reception waiting period.

The typical smart entry system transmits and receives all the signals illustrated in FIG. 2 by using UWB. UWB is characterized by a very wide frequency band. Sampling frequency on a receiver side is set depending on a maximum value of frequency of a carrier wave. Therefore, the receiver consumes a large amount of electric power. From this aspect, with reference to the sequence illustrated in FIG. 2, the vehicle, which is the receiver of the first ranging signal, is forced to consume electric power in a period of waiting for reception of the first ranging signal. Note that, as illustrated in FIG. 2, the reception waiting period ends at a timing of receiving the first ranging signal. The reception waiting period starts at any timing. For example, in the case of repeatedly performing the ranging process, the reception waiting period may start at a timing when Step S18 of a last ranging process ends.

In addition, the UWB data signal has a longer frame length than the ranging signal because the data signal includes the payload part. Therefore, receiving sensitivity of the UWB data signal is lower than the ranging signal. Accordingly, there is a room for improvement in receiving sensitivity in the overall ranging process using UWB. In addition, the processing time is increased due to encryption of information indicating $\Delta T1$ on the transmitter side and decryption of the information on the receiver side.

Therefore, according to the present embodiment, the period where the receiver waits for reception of the first ranging signal starts at an appropriate timing. This makes it possible to shorten the reception waiting period and reduce electric power to be consumed by the receiver. In addition, according to the present embodiment, it is also possible to omit transmission of the data signal. In this case, it is possible to improve the receiving sensitivity of the overall process and shorten the processing time. Next, technical features of the present embodiment will be described in detail.

<3. Technical Features>

(1) Authentication Based on Distance

According to the present embodiment, the portable device 100 and the communication unit 200 perform authentication based on a distance. The authentication based on the distance includes a ranging process of measuring a distance between the portable device 100 and the communication unit 200 (hereinafter, also referred to as the ranging process according to the present embodiment), and an authentication process of performing authentication based on the distance measured in the ranging process according to the present embodiment. Details of the ranging process according to the present embodiment will be described in the next section. In the latter authentication process, the communication unit 200 authenticates the portable device 100 on the basis of whether or not the measured distance satisfies a predetermined condition. For example, the communication unit 200 determines that the authentication has succeeded if the measured distance is a predetermined value or less. If not, the communication unit 200 determines that the authentication has failed.

(2) Ranging Process According to Present Embodiment

According to the present embodiment, the portable device 100 and the communication unit 200 perform the ranging process according to the present embodiment to perform authentication based on a distance. In a way similar to the conventional ranging process illustrated in FIG. 2, the ranging process according to the present embodiment includes transmission/reception of the ranging signals and calculation of a distance based on time taken to transmission/reception of the ranging signals. In particular, in the ranging process according to the present embodiment, transmission and reception directions of the first ranging signal and the second ranging signal used in the conventional ranging process illustrated in FIG. 2 are reversed, and transmission of the data signal is omitted. Note that, the first ranging signal transmitted and received in the ranging process according to the present embodiment is the same as the first ranging signal transmitted and received in the conventional ranging process. In a similar way, the second ranging signal transmitted and received in the ranging process according to the present embodiment is the same as the second ranging signal transmitted and received in the conventional ranging process.

Specifically, the communication unit 200 transmits the first ranging signal (corresponding to a second signal) to the portable device 100, and receives the second ranging signal (corresponding to a third signal) transmitted from the portable device 100 in response to the first ranging signal. $\Delta T1$ represents a time period from time when the communication unit 200 transmits the first ranging signal to time when the communication unit 200 receives the second ranging signal. On the other hand, the portable device 100 receives the first ranging signal from the communication unit 200, and transmits the second ranging signal to the communication unit 200 in response to the first ranging signal. $\Delta T2$ represents a time period from time when the portable device 100 receives the first ranging signal to time when the portable device 100 transmits the second ranging signal.

Here, when a prescribed time (corresponding to a first prescribed time) elapses after reception of the first ranging signal, the portable device 100 transmits the second ranging signal to the communication unit 200 in response to the first ranging signal. In other words, the time period $\Delta T2$ is the first prescribed time. The time period $\Delta T2$ is preferably known to the communication unit 200. Therefore, when the time period $\Delta T1$ from time of transmission of the first ranging signal to time of reception of the second ranging signal is measured, the communication unit 200 is capable of calculating a distance between the portable device 100 and the communication unit 200 on the basis of the measured $\Delta T1$ and the known $\Delta T2$. Specifically, time taken to transmit or receive a one-way signal is calculated by subtracting $\Delta T2$ from $\Delta T1$ and dividing the subtracted value by 2, and then the distance between the portable device 100 and the communication unit 200 is calculated by multiplying the calculated time by speed of the signal. As described above, according to the present embodiment, it is possible to omit encryption of the information indicating $\Delta T2$ on the transmitter side, transmission/reception of the data signal, or decryption of the information indicating $\Delta T2$ on the receiver side by setting $\Delta T2$ to the prescribed time. This makes it possible to shorten the overall processing time in comparison with the conventional ranging process illustrated in FIG. 2. In addition, the UWB data signal has a longer frame length than the ranging signal because the data signal includes the payload part. Therefore, receiving sensitivity of the UWB data signal on the receiver side is lower than the ranging signal. This is because the longer frame length may introduce more errors in reception in comparison with the ranging signal. From this aspect, it is possible to prevent deterioration in receiving sensitivity in the overall ranging process by omitting transmission/reception of the data signal.

The time period $\Delta T2$ is set to be longer than a time estimated to be required for a process from time when the portable device 100 receives the first ranging signal to time when the portable device 100 transmits the second ranging signal. This makes it possible to certainly finish preparation for transmission of the second ranging signal before the time period $\Delta T2$ elapses after reception of the first ranging signal.

(3) Transition to State of Waiting for Reception of Ranging Signal

Before transmission and reception of the ranging signals, a signal for notifying of information regarding transition to a state of waiting for reception of the ranging signal may be transmitted and received. Hereinafter, such a signal is also referred to as a notification signal.

An example of the notification signal is a signal for notifying that the portable device 100 has started waiting for reception of the ranging signal. Hereinafter, such a notification signal is also referred to as a first notification signal. The portable device 100 transmits the first notification signal to the communication unit 200. In other words, the first notification signal is a signal for notifying of information indicating that the portable device 100 has transitioned to the state of waiting for reception of the ranging signal. The first notification signal is an example of a first signal according to the present embodiment.

Another example of the notification signal is a signal for notifying of information indicating reception of the first notification signal. A second notification signal is transmitted in response to the first notification signal. The second notification signal is transmitted to the portable device 100 from the communication unit 200 that has received the first notification signal. The second notification signal is an example of a fourth signal according to the present embodiment.

The portable device 100 transmits the first notification signal to the communication unit 200. After the first notification signal is transmitted to the communication unit 200, the portable device 100 waits for reception of the first ranging signal transmitted from the communication unit 200. On the other hand, the communication unit 200 transmits the first ranging signal to the portable device 100 after the first notification signal is received from the portable device 100. As described above, the portable device 100 is capable of shortening the reception waiting period by not transitioning to the state of waiting for reception of the first ranging signal until transmission of the first notification signal. In addition, it is also possible to reduce electric power to be consumed because the reception waiting period is shortened. In particular, UWB consumes a large amount of electric power in the reception waiting state. Therefore, it is possible to drastically reduce an amount of electric power to be consumed by the portable device 100 when the reception waiting period is shortened.

The portable device 100 may wait for reception of the first ranging signal when triggered by reception of the second notification signal from the communication unit 200. Specifically, when the first notification signal is received, the communication unit 200 first transmits the second notification signal to the portable device 100 in response to the first notification signal. On the other hand, when the second notification signal is received, the portable device 100 waits for reception of the first ranging signal. At this time, the portable device 100 may wait for reception of the first ranging signal when a prescribed time (corresponding to a second prescribed time) elapses after reception of the second notification signal. The portable device 100 transitions to the reception waiting state when triggered by reception of the second notification signal. This makes it possible to avoid unnecessarily waiting for the first ranging signal during a retry period, and this makes it possible to shorten time taken to wait for reception of the first ranging signal. Note that, the retry is a process including retransmission of the first notification signal and the second notification signal.

Here, the notification signal and the ranging signal are transmitted and received in conformity with different wireless communication standards. It is assumed that a first wireless communication standard is used for transmission and reception of the notification signals, and a second wireless communication standard is used for transmission and reception of the ranging signals. For example, the first wireless communication standard and the second wireless communication standard may be different in frame configuration, header configuration, data length, encryption scheme, modulation scheme, frequency, or the like. At least the first wireless communication standard is a wireless communication standard under which a receiver consumes a lower amount of electric power than the second wireless communication standard. As a specific example that satisfies this requirement, the second wireless communication standard may use a carrier wave of higher frequency than frequency of a carrier wave used under the first wireless communication standard. Sampling frequency on the receiver side increases as a carrier wave has a higher frequency. This results in increase in amount of electric power to be consumed by the receiver. Sampling frequency on the receiver side decreases as a carrier wave has a lower frequency. This results in decrease in amount of electric power to be consumed by the receiver. Accordingly, it is possible to satisfy the above-described requirement regarding electric power consumption on the receiver side. Note that, considering that the sampling frequency is set depending on a maximum value of frequency of the carrier wave, it is sufficient to satisfy at least a requirement that maximum frequency of a carrier wave based on the second wireless communication standard is higher than maximum frequency of a carrier wave based on the first wireless communication standard. As described above, an amount of electric power consumed in the state of waiting for reception of the ranging signal is larger than an amount of electric power consumed in the state of waiting for reception of the notification signal because sampling frequency used for sampling in the state of waiting for reception of the ranging signal is higher than sampling frequency used for sampling in the state of waiting for reception of the notification signal. Accordingly, it is possible to reduce a total amount of electric power consumption by shortening the time taken to wait for reception of the ranging signal.

The communication unit 200 transmits the first ranging signal after transmission of the second notification signal. At this time, the communication unit 200 transmits the first ranging signal to the portable device 100 when a prescribed time (corresponding to a third prescribed time) elapses after transmission of the second notification signal. The third prescribed time is preferably set to be longer than the second prescribed time. This allows the portable device 100 to receive the first ranging signal after the portable device 100 transitions to the state of waiting for reception of the first ranging signal.

(4) Flow of Process

Figure 3:
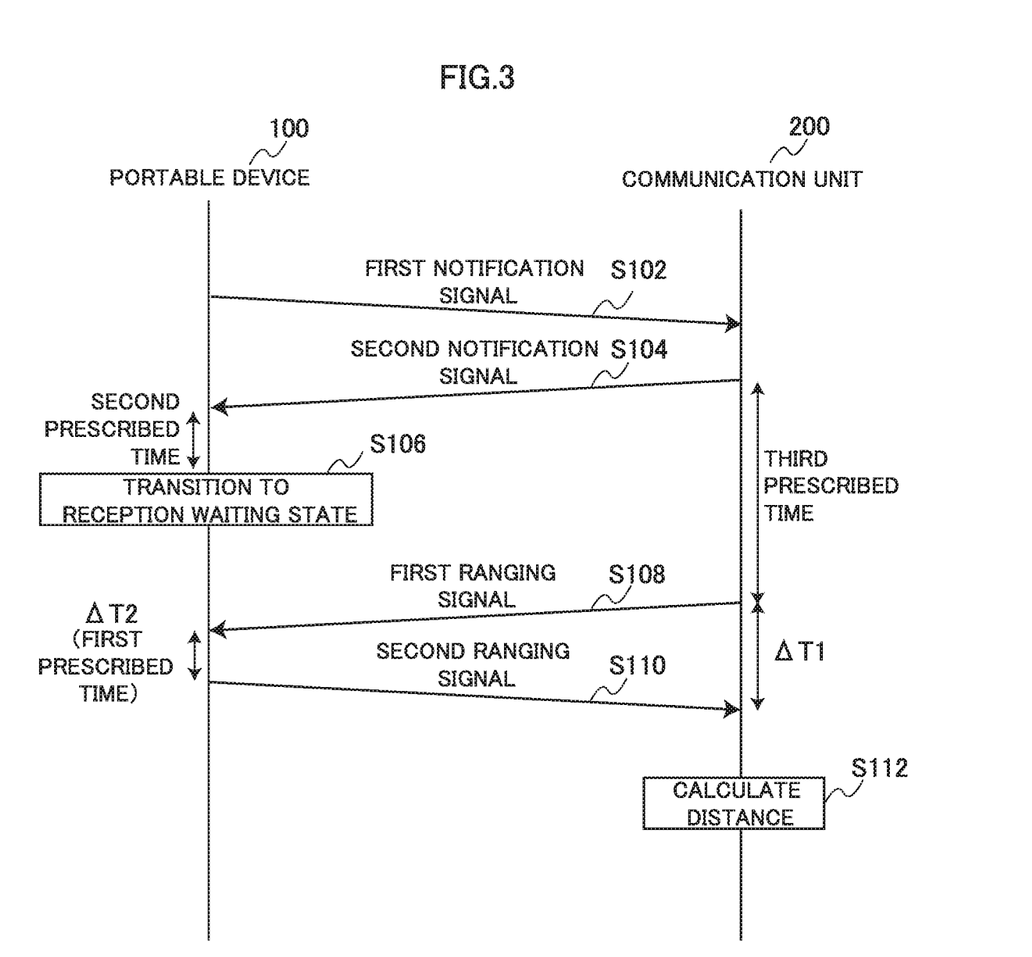
FIG. 3 is a sequence diagram illustrating an example of a flow of a ranging process according to the present embodiment, the ranging process being performed in the system according to the present embodiment.

Next, with reference to FIG. 3, a flow of the ranging process according to the present embodiment will be described. FIG. 3 is a sequence diagram illustrating an example of the flow of the ranging process according to the present embodiment, the ranging process being performed in the system 1 according to the present embodiment. The portable device 100 and the communication unit 200 are involved in this sequence.

As illustrated in FIG. 3, the portable device 100 first transmits the first notification signal (Step S102). When the first notification signal is received, the communication unit 200 transmits the second notification signal (Step S104). When the second notification signal is received, the portable device 100 transitions to the reception waiting state and waits for reception of the first ranging signal (Step S106). At this time, the portable device 100 waits for reception of the first ranging signal when a prescribed time (corresponding to the second prescribed time) elapses after reception of the second notification signal.

The communication unit 200 transmits the first ranging signal (Step S108) when a prescribed time (corresponding to the third prescribed time) elapses after the second notification signal is transmitted in Step S104. When the first ranging signal is received from the communication unit 200 and the time period $\Delta T2$ (corresponding to the first prescribed time) elapses after the reception of the first ranging signal, the portable device 100 transmits the second ranging signal (Step S110). When the second ranging signal is received, the communication unit 200 calculates a distance between the portable device 100 and the communication unit 200 (Step S112). Specifically, the communication unit 200 measures the time period $\Delta T1$ from time of transmission of the first ranging signal to time of reception of the second ranging signal, and calculates the distance on the basis of the measured time period $\Delta T1$ and the known time period $\Delta T2$.

(5) First Modification

The above-described example is the example in which the portable device 100 transitions to the reception waiting state when triggered by reception of the second notification signal. However, the present invention is not limited thereto. The portable device 100 may transition to the reception waiting state regardless of whether or not the second notification signal has been received. In this case, the portable device 100 waits for reception of the first ranging signal after the first notification signal is transmitted a predetermined number of times such as twice or more. This makes it possible to improve the probability that the communication unit 200 successfully receives the first notification signal, and this makes it possible to achieve gain equivalent to the ranging process according to the present embodiment triggered by reception of the second notification signal as illustrated in FIG. 3.

Figure 4:
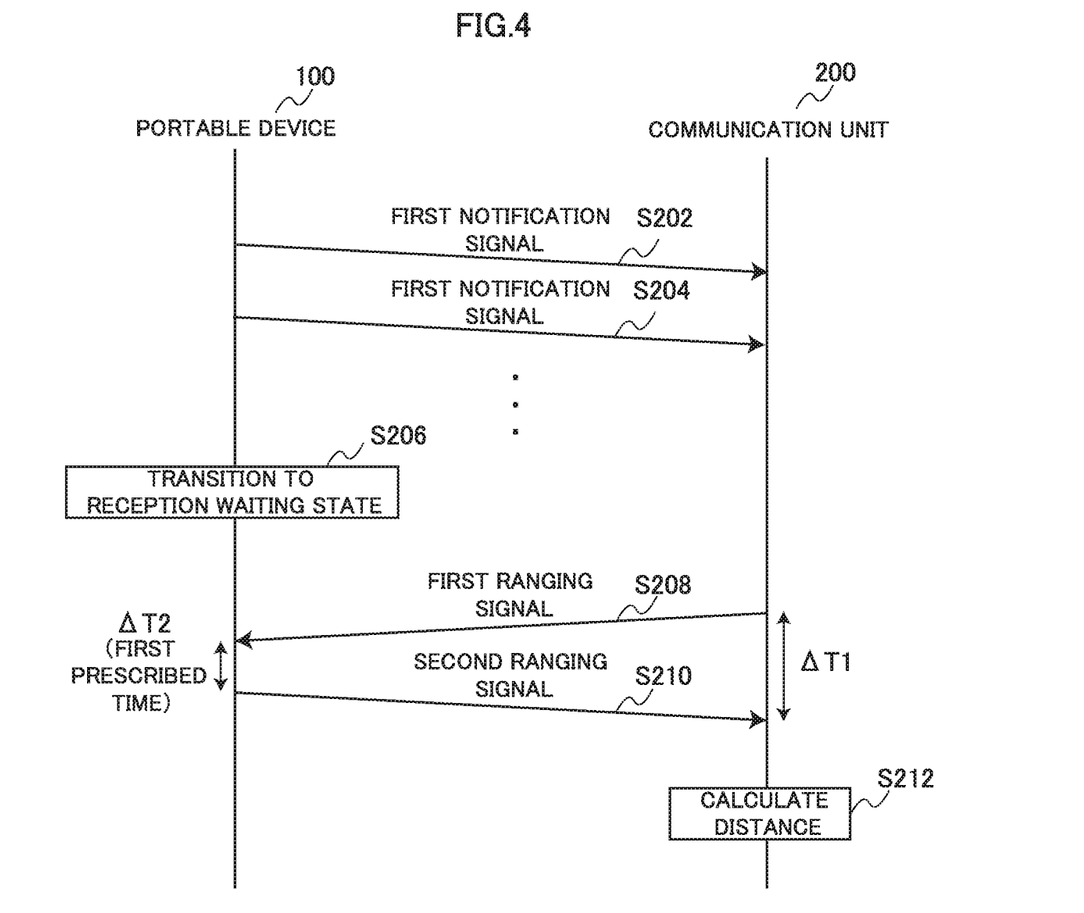
FIG. 4 is a sequence diagram illustrating another example of a flow of a ranging process according to a modification of the present embodiment, the ranging process being performed in the system according to the present embodiment.

Next, with reference to FIG. 4, a flow of the ranging process according to a modification of the present embodiment will be described. FIG. 4 is a sequence diagram illustrating another example of a flow of a ranging process according to the modification of the present embodiment, the ranging process being performed in the system 1 according to the present embodiment. The portable device 100 and the communication unit 200 are involved in this sequence.

As illustrated in FIG. 4, the portable device 100 repeatedly transmits the first notification signal a predetermined number of times (Steps S202 and S204). Next, after the predetermined number of transmissions, the portable device 100 transitions to the reception waiting state and waits for reception of the first ranging signal (Step S206). Processes in subsequent Steps S208 to S212 are similar to the processes in Steps S108 to S112 illustrated in FIG. 3.

Note that, according to the present modification, the first notification signal may be transmitted only once. That is, the portable device 100 may wait for reception of the first ranging signal after one-time transmission of the first notification signal.

(6) Second Modification

The notification signal is not limited to the first notification signal or the second notification signal described in the above embodiment. Other signals may be used as the notification signals.

Another example of the notification signals is a signal for instructing (or requesting) the portable device 100 to wait for reception of the ranging signal. Hereinafter, such a notification signal is also referred to as a third notification signal. The third notification signal is transmitted from the communication unit 200 to the portable device 100. The third notification signal is an example of a fifth signal according to the present embodiment.

Another example of the notification signal is a signal for notifying that the third notification signal is confirmed. Hereinafter, such a notification signal is also referred to as a fourth notification signal. The fourth notification signal is transmitted in response to the third notification signal. The fourth notification signal is transmitted to the communication unit 200 from the portable device 100 that has received the third notification signal.

After the third notification signal is transmitted to the portable device 100, the communication unit 200 transmits the first ranging signal to the portable device 100. On the other hand, the portable device 100 waits for reception of the first ranging signal transmitted from the communication unit 200, after the third notification signal is received from the communication unit 200. Note that, the communication unit 200 may transmit the first ranging signal when triggered by reception of the fourth notification signal from the portable device 100. Alternatively, in a way similar to the first modification described above, the communication unit 200 may transmit the first ranging signal regardless of whether or not the fourth notification signal is received from the portable device 100. Anyway, the portable device 100 is capable of shortening the reception waiting period by not transitioning to the state of waiting for reception of the first ranging signal until reception of the third notification signal.

Here, the notification signal and the ranging signal are transmitted and received in conformity with different wireless communication standards. It is assumed that the first wireless communication standard is used for transmission and reception of the notification signals, and the second wireless communication standard is used for transmission and reception of the ranging signals. For example, the first wireless communication standard and the second wireless communication standard may be different in frame configuration, header configuration, data length, encryption scheme, modulation scheme, frequency, or the like. At least the first wireless communication standard is a wireless communication standard under which a receiver consumes a lower amount of electric power than the second wireless communication standard. As a specific example that satisfies this requirement, the second wireless communication standard may use a carrier wave of higher frequency than frequency of a carrier wave used under the first wireless communication standard. Sampling frequency on the receiver side increases as a carrier wave has a higher frequency. This results in increase in amount of electric power to be consumed by the receiver. Sampling frequency on the receiver side decreases as a carrier wave has a lower frequency. This results in decrease in amount of electric power to be consumed by the receiver. Accordingly, it is possible to satisfy the above-described requirement regarding electric power consumption on the receiver side. Note that, considering that the sampling frequency is set depending on a maximum value of frequency of the carrier wave, it is sufficient to satisfy at least a requirement that maximum frequency of a carrier wave based on the second wireless communication standard is higher than maximum frequency of a carrier wave based on the first wireless communication standard. As described above, an amount of electric power consumed in the state of waiting for reception of the ranging signal is larger than an amount of electric power consumed in the state of waiting for reception of the notification signal because sampling frequency used for sampling in the state of waiting for reception of the ranging signal is higher than sampling frequency used for sampling in the state of waiting for reception of the notification signal. Accordingly, it is possible to reduce a total amount of electric power consumption by shortening the time taken to wait for reception of the ranging signal.

Figure 5:
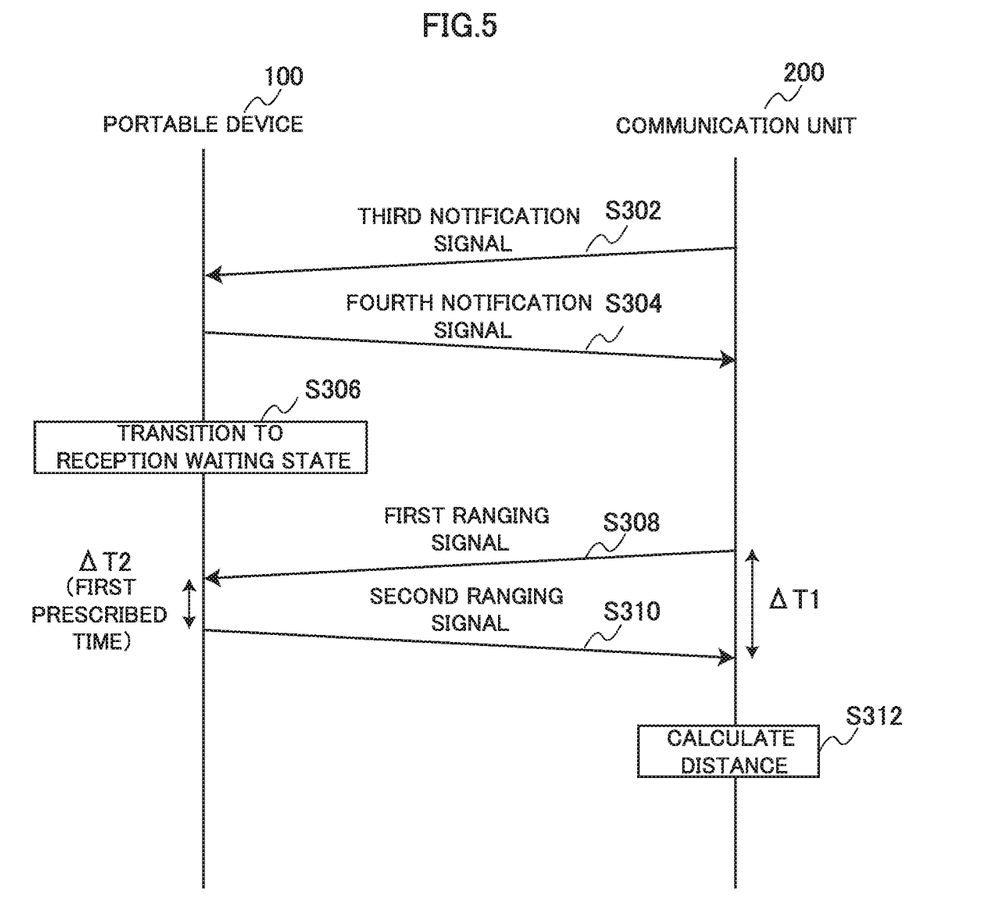
FIG. 5 is a sequence diagram illustrating another example of a flow of a ranging process according to a modification of the present embodiment, the ranging process being performed in the system according to the present embodiment.

Next, with reference to FIG. 5, a flow of the ranging process according to a modification of the present embodiment will be described. FIG. 5 is a sequence diagram illustrating another example of a flow of a ranging process according to the modification of the present embodiment, the ranging process being performed in the system 1 according to the present embodiment. The portable device 100 and the communication unit 200 are involved in this sequence.

As illustrated in FIG. 5, the communication unit 200 first transmits the third notification signal (Step S302). When the third notification signal is received, the portable device 100 transmits the fourth notification signal (Step S304). When the fourth notification signal is transmitted, the portable device 100 transitions to the reception waiting state and waits for reception of the first ranging signal (Step S306). Processes in subsequent Steps S308 to S312 are similar to the processes in Steps S108 to S112 illustrated in FIG. 3.

(7) Third Modification

In the above description, it has been assumed that the portable device 100 receives the first ranging signal only once in the reception waiting state. However, the present invention is not limited thereto. The portable device 100 may receive the first ranging signal multiple times in the reception waiting state.

First Example of Third Modification

As an example, the portable device 100 may transmit the second ranging signal each time the first ranging signal is received. An example of a flow of processes performed in this case will be described with reference to FIG. 6.

Figure 6:
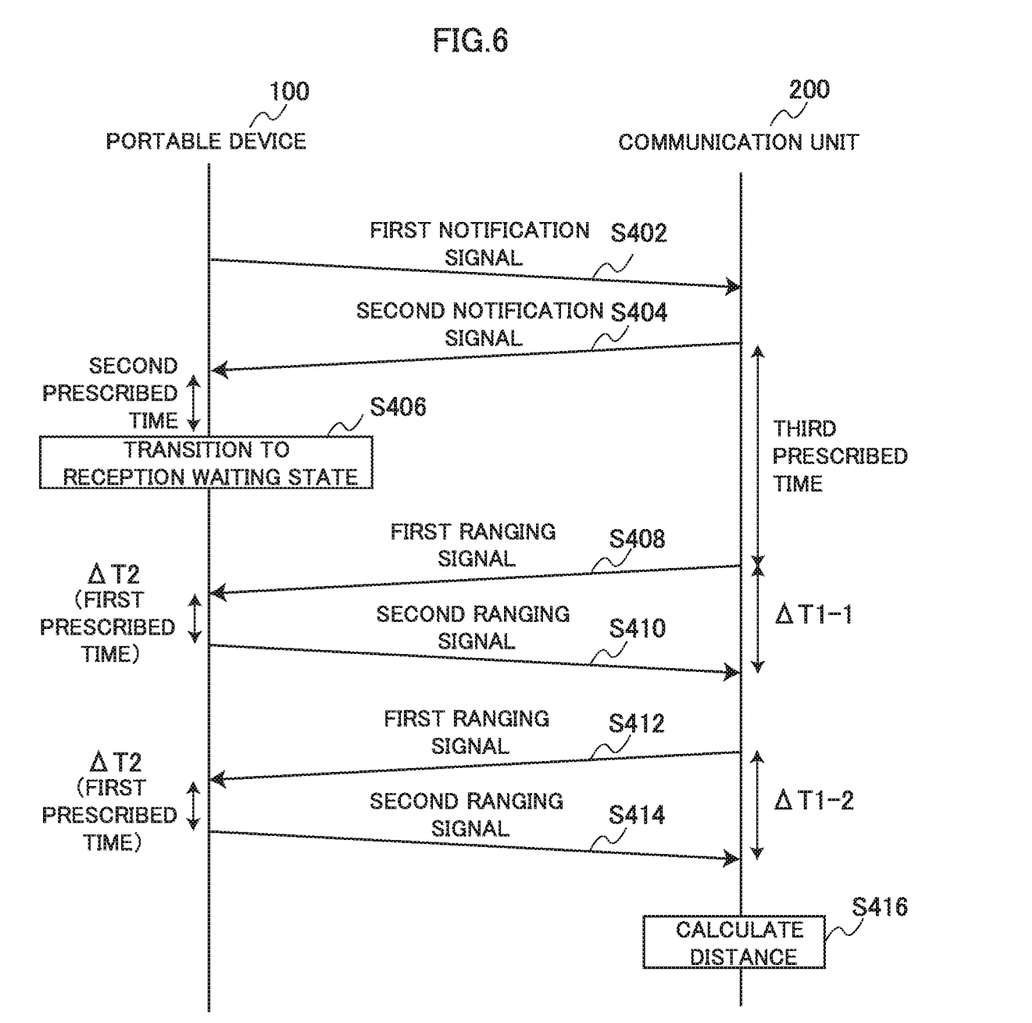
FIG. 6 is a sequence diagram illustrating another example of a flow of a ranging process according to a modification of the present embodiment, the ranging process being performed in the system according to the present embodiment.

FIG. 6 is a sequence diagram illustrating an example of a flow of a ranging process according to the modification of the present embodiment, the ranging process being performed in the system 1 according to the present embodiment. The portable device 100 and the communication unit 200 are involved in this sequence. Processes in Steps S402 to S406 illustrated in FIG. 6 are similar to the processes in Steps S102 to S106 illustrated in FIG. 3.

Subsequently, the communication unit 200 transmits the first ranging signal (Step S408) when a prescribed time (corresponding to the third prescribed time) elapses after the second notification signal is transmitted in Step S404. When the first ranging signal is received from the communication unit 200 and the time period ΔT2 (corresponding to the first prescribed time) elapses after the reception of the first ranging signal, the portable device 100 transmits the second ranging signal (Step S410). When the second ranging signal is received, the communication unit 200 measures a time period ΔT1-1 that is a time period from time of transmission of the first ranging signal in Step S408 to time of reception of the second ranging signal in Step S410.

Next, the communication unit 200 transmits the first ranging signal again (Step S412). When the first ranging signal is received from the communication unit 200 and the time period ΔT2 (corresponding to the first prescribed time) elapses after the reception of the first ranging signal, the portable device 100 transmits the second ranging signal (Step S414). When the second ranging signal is received, the communication unit 200 measures a time period ΔT1-2 that is a time period from time of transmission of the first ranging signal in Step S412 to time of reception of the second ranging signal in Step S414.

Next, the communication unit 200 calculates a distance on the basis of the measured time periods ΔT1-1 and ΔT1-2 and the known time period ΔT2 (Step S52+). For example, the communication unit 200 may calculate the distance by averaging a distance calculated on the basis of ΔT1-1 and ΔT2 and a distance calculated on the basis of ΔT1-2 and ΔT2.

Second Example of Third Modification

As another example, the portable device 100 may transmit the second ranging signal in the case where the first ranging signal is received a prescribed number of times. An example of a flow of processes performed in this case will be described with reference to FIG. 7.

Figure 7:
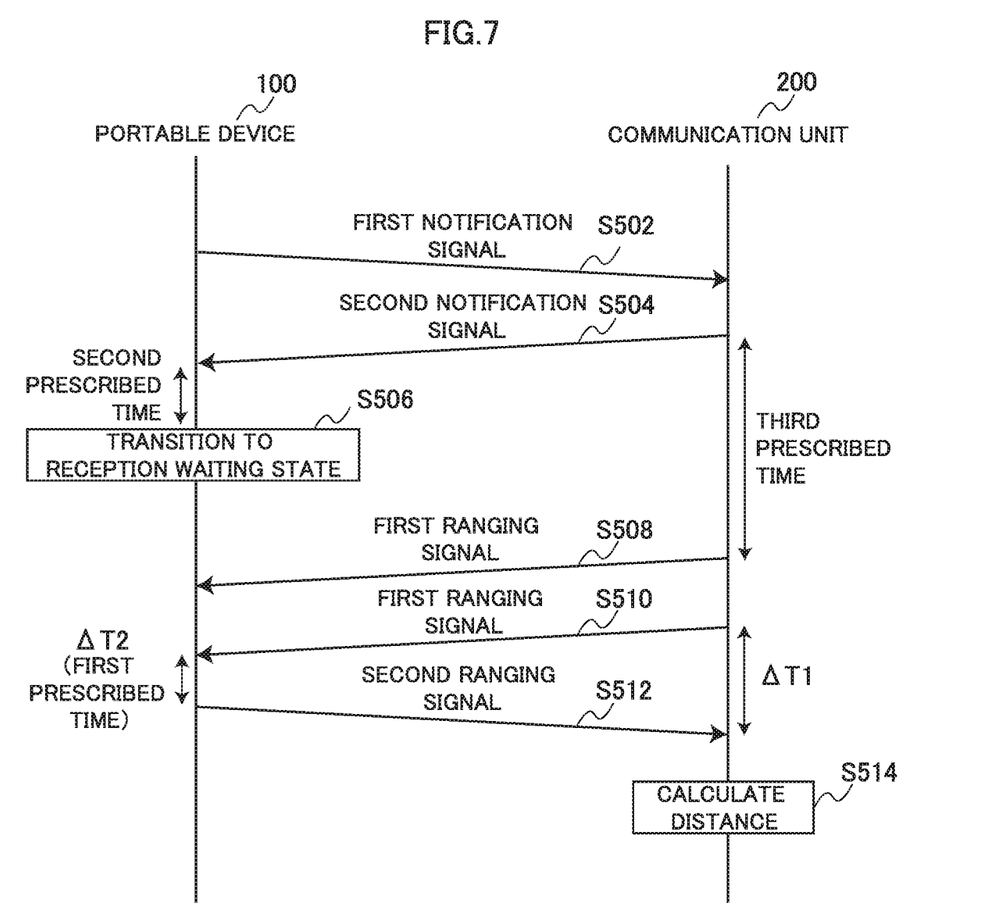
FIG. 7 is a sequence diagram illustrating another example of a flow of a ranging process according to a modification of the present embodiment, the ranging process being performed in the system according to the present embodiment.

FIG. 7 is a sequence diagram illustrating an example of a flow of a ranging process according to the modification of the present embodiment, the ranging process being performed in the system 1 according to the present embodiment. The portable device 100 and the communication unit 200 are involved in this sequence. Processes in Steps S502 to S506 illustrated in FIG. 7 are similar to the processes in Steps S102 to S106 illustrated in FIG. 3.

Subsequently, the communication unit 200 transmits the first ranging signal (Step S508) when a prescribed time (corresponding to the third prescribed time) elapses after the second notification signal is transmitted in Step S504. Next, the communication unit 200 further transmits the first ranging signal (Step S510).

The portable device 100 may transmit the second ranging signal in the case where the first ranging signal is received twice, for example. In this case, when the first ranging signal is received twice in Steps S508 and S510 and the time period ΔT2 (corresponding to the first prescribed time) elapses after the second reception of the first ranging signal, the portable device 100 transmits the second ranging signal (Step S512). When the second ranging signal is received, the communication unit 200 calculates a distance between the portable device 100 and the communication unit 200 on the basis of ΔT2 of the portable device 100 and length of time from the second transmission of the first ranging signal to reception of the second ranging signal (Step S514). Specifically, the communication unit 200 measures the time period ΔT1 from time of transmission of the first ranging signal in Step S510 to time of reception of the second ranging signal, and calculates the distance on the basis of the measured time period ΔT1 and the known time period ΔT2.

<4. Supplement>

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, the time period ΔT2 may be dynamically set between the portable device 100 and the communication unit 200. For example, one of the portable device 100 and the communication unit 200 may decide the time period ΔT2, and the decided time period ΔT2 may be transmitted to the other of the portable device 100 and the communication unit 200 at a time of transmission or reception of the notification signal, at a time of initial communication, or at other timings. Of course, it is also possible to set a common time period ΔT2 for the portable device 100 and the communication unit 200 prior to shipment from a factory. Alternatively, the time period ΔT2 may be set by a device other than the portable device 100 or the communication unit 200, such as an information processing terminal (server).

In addition, for example, the example of transmitting and receiving the notification signals has been described in the above embodiment. However, the present invention is not limited thereto. Any other signals can be used as the notification signals. Specifically, any other signals may serve as the notification signals. As an example, any other signals may be synchronization signals. The synchronization signal is a signal transmitted and received for achieving time synchronization between devices.

An example of the time synchronization is frame synchronization. According to another example of the time synchronization, the portable device 100 and the communication unit 200 share information indicating how many clocks (seconds) it takes before transmission of the first ranging signal or before transition to the reception waiting state. According to another example of the time synchronization, the portable device 100 and the communication unit 200 share information indicating time to transmit the first ranging signal or time to transition to the reception waiting state.

Note that, in the case where the synchronization signal is used as the notification signal and the ranging process is performed after synchronization is established between the portable device 100 and the communication unit 200, it is expected to measure the time period ΔT1 more accurately and improve ranging accuracy. As another example, any other signals may be a wake-up signal for instructing to activate a device. As another example, any other signal may be a signal for request response authentication. In addition, a communication signal may be transmitted by attaching the communication signal to such a signal.

Note that, the request response authentication is a method in which an authenticator generates an authentication request and transmits the generated authentication request to an authenticatee, the authenticatee generates an authentication response on the basis of the authentication request and transmits the generated authentication response to the authenticator, and the authenticator authenticates the authenticatee on the basis of the authentication response. Typically, the authentication request is a random number, and is changed with each authentication. Accordingly, the request response authentication is resistant to a replay attack. In addition, the authentication response is generated on the basis of information regarding the authenticatee (such as an ID and a password, for example). In other words, the ID and the password themselves are not transmitted/received. This makes it possible to prevent eavesdropping. An example of signals for the request response authentication is a signal including the authentication request and a signal including the authentication response.

In addition, for example, the example of using the present invention to wait for reception of the ranging signal has been described in the above embodiment. However, application targets of the present invention are not limited thereto. For example, the present invention may be used to wait for reception of any other signals such as the data signal.

In addition, a timing of transmission of the notification signal may be any timing before transmission or reception of the ranging signal. For example, in the case where the request response authentication is performed before authentication based on a distance, the notification signal may be transmitted at any timing before, after, or during the request response authentication. As another example, the communication signal may be transmitted at any timing before or after transmission of the wake-up signal.

In addition, any frequency band may be used for transmitting the notification signal. For example, the notification signal may be transmitted by using a same frequency band as the ranging signal, or a different frequency band from the ranging signal. In addition, the notification signal may be transmitted as a UWB signal, an LF band signal, an RF band signal, or a Bluetooth Low Energy (BLE) (registered trademark) signal.

For example, the above embodiment has been described on the assumption that the time period $\Delta T2$ is known to the communication unit 200. However, present invention is not limited thereto. For example, the time period $\Delta T2$ may be measured by the portable device 100 and may be reported to the communication unit 200 by the portable device 100. Such a report may be made by transmitting a data signal that stores information indicating the time period $\Delta T2$. In the second example of the third modification described above with reference to FIG. 7, it is possible to measure a plurality of time periods $\Delta T2$ from respective times when the portable device 100 receives the plurality of first ranging signals to time when the portable device 100 transmits the second ranging signal, and report the plurality of measured time periods $\Delta T2$ to the communication unit 200.

In addition, for example, although the example in which the portable device 100 serves as the authenticatee and the control unit 200 serves as the authenticator has been described in the above embodiment, the present invention is not limited thereto. The roles of the portable device 100 and the communication unit may be reversed, or the roles may be switched dynamically. In addition, the ranging and authentication may be performed between the communication units 200.

In addition, for example, although the example in which the present invention is applied to the smart entry system has been described in the above embodiment, the present invention is not limited thereto. The present invention is applicable to any system that performs the ranging and authentication by transmitting/receiving signals. For example, the present invention is applicable to a pair of any devices selected from a group including portable devices, vehicles, smartphones, drones, houses, home appliances, and the like. In this case, one in the pair operates as the authenticator, and the other in the pair operates as the authenticatee. Note that, the pair may include two device of a same type, or may include two different types of devices.

In addition, for example, in the above embodiment, the standard using UWB has been exemplified as the wireless communication standard. However, the present invention is not limited thereto. For example, it is also possible to use a standard using infrared as the wireless communication standard.

In addition, for example, although the above embodiment has been described on the assumption that the communication unit 200 calculates the distance based on $\Delta T1$ and $\Delta T2$ and performs the authentication based on the distance, the present invention is not limited thereto. For example, any of such processes may be performed by another device such as a server or a roadside unit (RSU).

In addition, the above embodiment has been described on the assumption that the portable device 100 waits for reception of the first ranging signal when the second prescribed time elapses after the second notification signal is received from the communication unit 200. However, the present invention is not limited thereto. For example, the portable device 100 may wait for reception of the first ranging signal when the second prescribed time elapses after transmission of the first notification signal.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into RAM, and executed by a processor such as a CPU. The recording medium may be a magnetic disk, an optical disc, a magneto-optical disc, flash memory, or the like, for example. Alternatively, the above-described computer program may be distributed via a network without using the recording medium, for example.

Further, in the present specification, the processes described using the flowcharts and the sequence diagrams are not necessarily executed in the order illustrated in the drawings. Some processing steps may be executed in parallel. In addition, additional processing steps may be employed and some processing steps may be omitted.

REFERENCE SIGNS LIST 1 system
100 portable device
110 wireless communication section
120 storage section
130 control section
200 communication unit
202 vehicle
210 wireless communication section
220 storage section
230 control section

What is claimed is:
1. A communication device comprising:
a control section configured to control the communication device to
  transmit a first signal to another communication device, and
  wait for reception of a second signal transmitted from the other communication device after the first signal is transmitted to the other communication device, and
  transmit a third signal to the other communication device in response to reception of the second signal when a first prescribed time elapses after reception of the second signal,
wherein the first prescribed time is known to the other communication device.
2. The communication device according to claim 1, wherein the first prescribed time is longer than a time required to finish preparation for transmission of the third signal.
3. The communication device according to claim 1, wherein the second signal and the third signal are ranging signals transmitted and received for measuring a distance between the communication device and the other communication device.

4. The communication device according to claim 1,
wherein the other communication device is configured to transmit a notification signal in response to receiving the first signal transmitted from the communication device, and
wherein the control section is configured to control the communication device to wait for reception of the second signal after the notification signal is received from the other communication device in response to the first signal.

5. The communication device according to claim 4,
wherein the control section is configured to control the communication device to wait for reception of the second signal when a second prescribed time elapses after reception of the notification signal.

6. The communication device according to claim 4,
wherein the notification signal notifies the communication device that the other communication device has received the first signal.

7. The communication device according to claim 4,
wherein the first signal and the notification signal are synchronization signals transmitted and received for achieving time synchronization between the communication device and the other communication device.

8. The communication device according to claim 1,
wherein the first signal is a notification signal notifying the other communication device that the communication device is waiting for reception of the second signal.

9. The communication device according to claim 1,
wherein the control section is configured to control the communication device to wait for reception of the second signal after the first signal is transmitted at least two times.

10. The communication device according to claim 1, wherein
the other communication device is installed in a vehicle, and
the communication device is carried by a user of the vehicle.

11. A communication device comprising:
a control section configured to control the communication device to
receive a first signal transmitted from another communication device, and
transmit a second signal to the other communication device after the first signal is received from the other communication device,
wherein the control section calculates a distance between the communication device and the other communication device on a basis of
a time period from the time of transmission of the second signal from the communication device to the other communication device to the time of reception of a third signal by the communication device transmitted from the other communication device in response to the reception of the second signal, and
a first prescribed time,
wherein the first prescribed time is the time from receipt of the second signal by the other communication device to transmission of the third signal by the other communication device,
wherein the first prescribed time is known to the communication device.

12. The communication device according to claim 11,
wherein the control section is configured to control the communication device to transmit a notification signal to the other communication device in response to receipt of the first signal and then transmit the second signal.

13. The communication device according to claim 12,
wherein the control section is configured to control the communication device to transmit the second signal when a third prescribed time elapses after transmission of the notification signal.

14. The communication device according to claim 11,
wherein the control section calculates a distance between the communication device and the other communication device on a basis of the first prescribed time set as a time period from receipt of the second signal by the communication device to transmission of the third signal to the other communication device in response to receipt of the second signal.

15. The communication device according to claim 14,
wherein the control section calculates the distance between the communication device and the other communication device further on a basis of a value obtained by subtracting the first prescribed time from a time period from the time of transmission of the second signal to the time of reception of the third signal.

16. A communication device configured to transmit a first signal to another communication device, wherein
the first signal is a signal for instructing the other communication device to wait for reception of a second signal transmitted from the communication device after the first signal, and
the communication device transmits and the other communication device receives the first signal and the communication device transmits and the other communication device receives the second signal in conformity with different wireless communication standards,
wherein the communication device transmits the first signal and the other communication device receives the first signal in conformity with a first wireless communication standard,
wherein the communication device transmits the second signal and the other communication device receives the second signal in conformity with a second wireless communication standard, and
wherein the second wireless communication standard uses a carrier wave of higher frequency than the frequency of a carrier wave used under the first wireless communication standard.

17. A communication device comprising:
a control section configured to
receive a first signal from another communication device, and
wait for reception of a second signal transmitted from the other communication device after receipt of the first signal from the other communication device,
wherein the other communication device transmits the first signal and the communication device receives the first signal in conformity with a wireless communication standard different from the wireless standard used by the other communication device to transmit the second signal and used by the communication device to receive the second signal,
wherein the communication device receives the first signal and the other communication device transmits the first signal in conformity with a first wireless communication standard, wherein the communication device receives the second signal and the other communication device transmits the second signal in conformity with a second wireless communication standard, and wherein the second wireless communication standard uses a carrier wave of higher frequency than the frequency of a carrier wave used under the first wireless communication standard.

18. A communication device comprising:

a control section configured to control the communication device to transmit a first signal to another communication device,     wait for reception of a second signal transmitted from the other communication device after the first signal is transmitted to the other communication device, and     transmit a third signal to the other communication device in response to receipt of the second signal when a first prescribed time elapses after reception of the second signal, wherein while the communication device is waiting for reception of the second signal, the communication device is in a state configured to acquire and process a desired signal, and wherein the communication device transmits the first signal and the other communication device receives the first signal using a first wireless communication standard, wherein the communication device receives the second signal and transmits the third signal using a second wireless communication standard, wherein the other communication device transmits the second signal and receives the third signal using the second wireless communication standard, and wherein the second wireless communication standard uses a carrier wave of higher frequency than the frequency of a carrier wave used under the first wireless communication standard.

19. A communication device comprising:

a control section configured to control the communication device to transmit a first signal to another communication device,     wait for reception of a second signal transmitted from the other communication device after the first signal is transmitted to the other communication device, and     transmit a third signal to the other communication device in response to receipt of the second signal after reception of the second signal, wherein while the communication device is waiting for reception of the second signal, the communication device is in a state configured to acquire and process a desired signal, and wherein the communication device transmits the first signal and the other communication device receives the first signal using a first wireless communication standard, wherein the communication device receives the second signal and transmits the third signal using a second wireless communication standard, wherein the other communication device transmits the second signal and receives the third signal using the second wireless communication standard, and wherein the second wireless communication standard uses a carrier wave of higher frequency than the frequency of a carrier wave used under the first wireless communication standard.

\* \* \* \* \*